(12) United States Patent
Qian et al.

(10) Patent No.: US 8,869,173 B2
(45) Date of Patent: *Oct. 21, 2014

(54) ADAPTIVE APPLICATION INTERFACE MANAGEMENT

(71) Applicant: AT&T Intellectual Property I, L.P., Atlanta, GA (US)

(72) Inventors: Zhiqiang Qian, Holmdel, NJ (US); Paritosh Bajpay, Edison, NJ (US); Jackson Liu, Middletown, NJ (US); Michael John Zinnikas, North Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 11 days.

This patent is subject to a terminal disclaimer.

(21) Appl. No.: 13/633,232

(22) Filed: Oct. 2, 2012

(65) Prior Publication Data

US 2013/0042256 A1  Feb. 14, 2013

Related U.S. Application Data

(63) Continuation of application No. 12/273,419, filed on Nov. 18, 2008, now Pat. No. 8,281,322.

(51) Int. Cl.
| | |
|---|---|
| G06F 3/00 | (2006.01) |
| G06F 9/54 | (2006.01) |
| G06F 11/00 | (2006.01) |
| G06F 11/30 | (2006.01) |
| H04L 12/26 | (2006.01) |
| G06F 11/07 | (2006.01) |

(52) U.S. Cl.
CPC .............. *G06F 9/542* (2013.01); *G06F 11/079* (2013.01); *G06F 9/54* (2013.01); *H04L 43/08* (2013.01); *H04L 43/16* (2013.01); *H04L 12/26* (2013.01); *G06F 11/0703* (2013.01)
USPC ............... 719/318; 719/313; 710/15; 710/17; 710/18; 714/100; 714/25; 714/48

(58) Field of Classification Search
None
See application file for complete search history.

(56) References Cited

U.S. PATENT DOCUMENTS

| | | | |
|---|---|---|---|
| 3,980,505 | A | 9/1976 | Buckley |
| 4,478,872 | A | 10/1984 | Pulliam |
| 4,530,059 | A | 7/1985 | Brearley et al. |
| 4,584,237 | A | 4/1986 | Pulliam |
| 5,191,896 | A | 3/1993 | Gafni et al. |
| 5,361,326 | A | 11/1994 | Aparicio, IV et al. |
| 5,668,392 | A | 9/1997 | Huang et al. |
| 5,675,272 | A | 10/1997 | Chu |
| 6,026,440 | A | 2/2000 | Shrader et al. |
| 6,222,387 | B1 | 4/2001 | Meng et al. |
| 6,272,452 | B1 | 8/2001 | Wu et al. |
| 6,452,617 | B1 | 9/2002 | Bates et al. |
| 6,480,489 | B1 | 11/2002 | Muller et al. |

(Continued)

*Primary Examiner* — Qing Wu
(74) *Attorney, Agent, or Firm* — Scott P. Zimmerman, PLLC

(57) ABSTRACT

A method and system for adaptive processing of alert messages exchanged between applications is disclosed. The system may include a diagnostic engine coupled to a plurality of applications. A plurality of application alert messages may be monitored to determine if the alerts exceed a predetermined threshold. If a threshold number of alert messages is exceeded, an interface status based on a diagnostic code for the interface may be determined. A query value for the interface may be adjusted. Based on the amount of the increase in the alert messages, different actions may be indicated. An administrator for the application interface or for equipment associated with the interface may be notified for servicing the equipment.

20 Claims, 4 Drawing Sheets

(56) References Cited

U.S. PATENT DOCUMENTS

| | | |
|---|---|---|
| 6,732,186 B1 | 5/2004 | Hebert |
| 6,756,999 B2 | 6/2004 | Stoakley et al. |
| 6,826,523 B1 | 11/2004 | Guy et al. |
| 6,903,719 B2 | 6/2005 | Richley |
| 6,981,242 B2 | 12/2005 | Lehmeier et al. |
| 7,100,067 B2 | 8/2006 | Hansen et al. |
| 7,103,852 B2 | 9/2006 | Kairis, Jr. |
| 7,149,291 B1 | 12/2006 | Deshpande |
| 7,242,409 B2 | 7/2007 | Cain |
| 7,379,999 B1 | 5/2008 | Zhou et al. |
| 7,457,872 B2 | 11/2008 | Aton et al. |
| 2001/0035882 A1 | 11/2001 | Stoakley et al. |
| 2002/0135558 A1 | 9/2002 | Richley |
| 2003/0063723 A1 | 4/2003 | Booth et al. |
| 2003/0132970 A1 | 7/2003 | Lehmeier et al. |
| 2004/0109014 A1 | 6/2004 | Henderson |
| 2004/0178994 A1 | 9/2004 | Kairis, Jr. |
| 2004/0186674 A1 | 9/2004 | Hansen et al. |
| 2005/0102352 A1 | 5/2005 | Zhang et al. |
| 2005/0240315 A1 | 10/2005 | Booth et al. |
| 2006/0098672 A1 | 5/2006 | Schzukin et al. |
| 2006/0117263 A1 | 6/2006 | Locke |
| 2006/0200773 A1 | 9/2006 | Nocera et al. |
| 2006/0227149 A1 | 10/2006 | Cain |
| 2006/0236264 A1 | 10/2006 | Cain et al. |
| 2006/0281416 A1 | 12/2006 | Hansen et al. |
| 2007/0043535 A1 | 2/2007 | Beldin |
| 2007/0174716 A1 | 7/2007 | Erdtmann et al. |
| 2007/0234426 A1 | 10/2007 | Khanolkar et al. |
| 2008/0085502 A1 | 4/2008 | Allen et al. |
| 2008/0154899 A1 | 6/2008 | Carmony |
| 2008/0212901 A1 | 9/2008 | Castiglia et al. |

ADAPTIVE APPLICATION INTERFACE MANAGEMENT

CROSS-REFERENCE TO RELATED APPLICATION

This patent application is a continuation of U.S patent application Ser. No. 12/273419, filed Nov. 18, 2008 and now issued as U.S. Pat. No. 8,281,322, the entirety of which is hereby incorporated by reference.

The present disclosure relates to application communication and, more particularly, to managing application interfaces.

DESCRIPTION OF THE RELATED ART

Mission-critical business systems, such as telephony customer service platforms, may include a central processing engine communicating with numerous peripheral applications. The operation of the processing engine may depend upon interfaces to enable communications with the peripheral applications.

DESCRIPTION OF THE EMBODIMENT(S)

Figure 1:
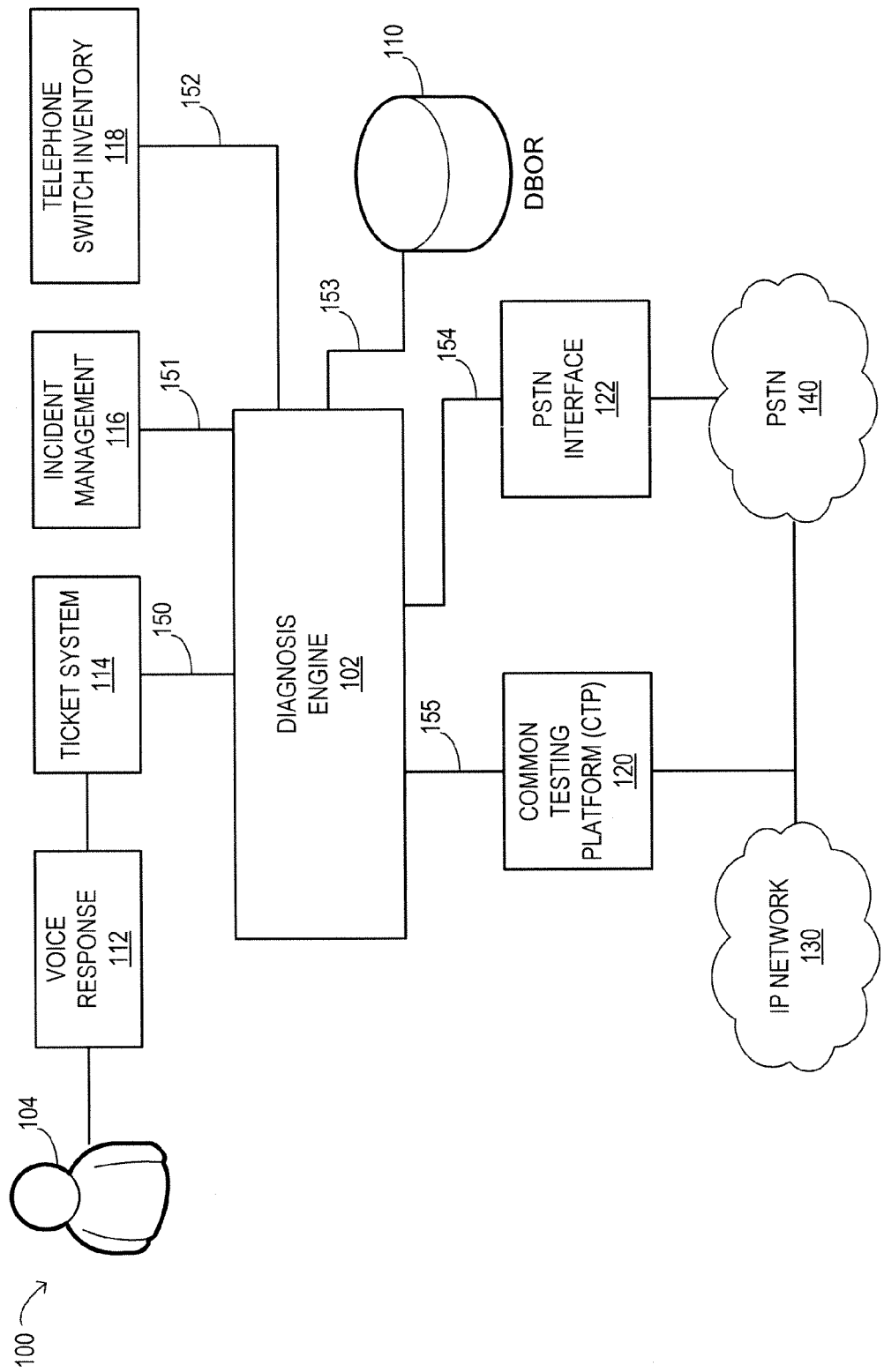
FIG. 1 is a block diagram of selected elements of a business system having a plurality of application interfaces.

Automated processing of transactions is a key economic aspect to many business systems providing customer services. For business systems that support a large number of customers, the reliability of the automated processing may be a mission-critical feature, because the cost or availability of manual resources may be prohibitive. One example of such a business system is a customer support platform for telephony service, in which the number of support transactions handled automatically without interruption may be very large.

In one aspect, the transactional processing of the business system may be facilitated by a central diagnostic engine, which itself may be an application incorporating rule-based processing. The diagnostic engine may further be interfaced to a plurality of peripheral applications representing various aspects of the overall business system. The individual interfaces to the peripheral applications enable the diagnostic engine to carry out rules-based procedures, for example, for responding to or diagnosing a support request. Thus, the proper functioning of the interfaces, both physical and logical, between the central diagnostic engine and the plurality of peripheral applications may be determinative for the overall reliability of the business system.

In one aspect, a disclosed method for adaptive processing of inter-application alerts includes setting a threshold for inter-application alerts associated with an application interface and generated within a monitoring interval. In response to the inter-application alerts exceeding the threshold, a diagnostic code associated with at least one of the inter-application alerts may be analyzed to determine an interface status associated with the inter-application alert. Further, in response to the diagnostic code indicating a non-responsive interface status, a query value for the inter-application alert may be adjusted. The method may further include storing the query value or displaying a message indicative of the alerts exceeding the threshold, or both.

In some embodiments, the interface status may be a timeout status, while the query value may be a timeout value. The interface status may be a busy status, while the query value may be at least one of a priority value and the monitoring interval. In some cases, the diagnostic code indicates a missing data status, while the method further includes notifying a maintenance entity associated with the application interface about the inter-application alert.

In some implementations, for inter-application alerts exceeding the threshold by a minimum amount, the method further includes escalating a priority of at least one of the inter-application alerts to an enhanced priority. A maintenance entity associated with the application interface may be notified about the enhanced priority inter-application alert. The maintenance entity may be requested to evaluate a throughput capacity of at least one network system associated with the enhanced priority inter-application alert. In some examples, the maintenance entity may be requested to evaluate equipment associated with at least one network system associated with the enhanced priority inter-application alert.

In another aspect, a disclosed system for adaptive processing of inter-application alerts includes a processor, and memory media accessible to the processor, including processor executable instructions. The instructions may be executable to monitor a plurality of inter-application alerts, corresponding to a plurality of application interfaces between a diagnostic engine and a plurality of applications, and in response to exceeding a threshold number of inter-application alerts associated with an application interface, determine an interface status based on at least one diagnostic code associated with at least one of the inter-application alerts.

Based on the interface status indicating a timeout status, the instructions may be executable to increase a timeout value for the application interface. Based on the interface status indicating a busy status the instructions may be executable to increase a priority value for the application interface. Based on the interface status indicating a missing data status, the instructions may be executable to notify an administrator for the application interface. The threshold may be exceeded by a predetermined amount, and the instructions may further be executable to request testing of equipment associated with the application interface.

In some embodiments, the diagnostic engine may be configured to process customer support events in response to providing telephone service to a plurality of customers. The plurality of application interfaces may include an interface to an Internet-protocol (IP) network, or to a Public Switched Telephone Network (PSTN), or both. The plurality of application interfaces may include an interface to at least one of: a customer-support ticket system, an incident management system, a telephone switch inventory system, and a database of records.

In still another aspect, a disclosed computer-readable memory media includes processor executable instructions for adaptive processing of inter-application alerts. The instructions may be executable to detect an increase in the number of inter-application alerts for a plurality of application interfaces between a diagnostic engine and a plurality of applications. The instructions may further be executable to, in response to said increase, determine an amount of the increase relative to a threshold value for at least one of the application interfaces, and based on the amount of the increase and at least one diagnostic code associated with the at least one application interface, determine an interface status for the application interface.

In some embodiments, the instructions may be executable to increase a timeout value for the application interface based on the interface status indicating a timeout status. The instructions may be executable to increase a priority value for the application interface based on the interface status indicating a busy status. The instructions may be executable to notify an administrator for the application interface based on the interface status indicating a missing data status.

In some instances, in response to the amount of the increase being greater than the threshold value, the instructions may be executable to request priority service of equipment associated with the application interface. The equipment may be included in a telephone system configured to provide telephony service to a plurality of customers. The telephone system may include an IP network or a PSTN or both.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Referring now to FIG. 1, a block diagram of selected elements of a business system 100 having a plurality of peripheral application interfaces is illustrated. Business system 100, as depicted in FIG. 1, may represent a customer support platform for providing telephony service to a large number of customers. Although the methods described herein refer to exemplary embodiments of business system 100 for clarity, it is noted that aspects of the disclosure related to application interfaces may be practiced with other types of business systems.

In business system 100, user 104 is depicted requesting customer support. User 104 may be a telephony services customer of the entity owning or operating business system 100, or parts thereof. Accordingly, user 104 may access either IP network 130 or PSTN 140 as their telephone system. User 104 may access IP network 130 or PSTN 140 using customer premises equipment (CPE) provided with a service contract for telephony service, or may use third-party or privately-owned equipment (neither shown in FIG. 1).

User 104 may request customer support for a wide range of issues, from contract or billing inquiries, or for telephony service issues, such as outages, service degradation, connection problems, etc. Accordingly, business system 100 may be configured to provide a broad range of support services for the operation of IP network 130 and PSTN 140. As will be described below with respect to numerous interfaces and peripheral applications, business system 100 may be configured to automatically resolve a large number of support inquiries based on a very large number of users.

As shown in FIG. 1, user 104 may directly interact with voice response system 112. In some embodiments, voice response system 112 includes automated processing for incoming support requests, including interactive response to commands from user 104. Voice response system 112 may also encompass interaction with a human operator (not shown in FIG. 1), who is equipped to provide support and aid to user 104 for diagnosing and/or resolving a telephony service issue. In some embodiments, voice response system 112 is a call center, including both automated and human voice operators.

As depicted in FIG. 1, voice response system 112 is coupled to ticket system 114, which may be responsible for generating and tracking support "tickets" or support incidents. It is noted that tickets may be generated in response to an inquiry by user 104, or may be internally generated. Ticket system 114 may track the progress of support incidents, and may close out tickets that have been resolved. A ticket may, in turn, generate a request for specific support actions related to the original request, and further provide tracking and reporting on such actions. Ticket system 114 may further be used to statistically analyze a large number of support tickets for evaluating overall performance of business system 100. In some embodiments, ticket system 114 includes a storage system (not shown in FIG. 1), such as an internal database, for storing and tracking support tickets.

In FIG. 1, ticket system 114 may be configured to notify diagnosis engine 102 using application interface 150 when a new ticket has been generated. As such, application interface 150 may be considered an "inter-application" interface, providing connectivity between applications of ticket system 114 and diagnosis engine 102.

Diagnosis engine 102 in FIG. 1 may serve as a central, rules-based application for managing customer support operations for business system 100. As will be described in detail below, diagnosis engine 102 may be coupled via application interfaces 150-155 respectively to ticket system 114, incident management 116, telephone switch inventory 118, database of records (DBOR) 110, PSTN interface 122, and common testing platform (CTP) 120, which are collectively referred to herein as "peripheral applications." It is noted that application interfaces 150-155 are exemplary embodiments of inter-application interfaces and may be augmented, replaced, or eliminated in different embodiments of business system 100.

Diagnosis engine 102 may be responsible for sending requests, commands or information, logical decision-making, and receiving requests, notifications or responses. If diagnosis engine 102 is faced with a failure associated with application interfaces 150-155, there may be an interruption in providing customer support in business system 100. It is also noted that the reliability of application interfaces 150-155 contributes to overall system reliability, and thus, system availability. In some embodiments, diagnosis engine 102 may be configured for 99.999% availability with respect to time and/or support requests.

Diagnosis engine 102 is coupled via application interface 151 to incident management 116. Incident management 116 may be responsible for tracking outages or interruptions to telephony service provided by IP network 130 and/or PSTN 140, referred to herein as "incidents." For example, if a portion of IP network 130 is undergoing scheduled maintenance, incident management 116 may be configured to provide a notification of network outage for an affected group of customers, or to confirm a network outage for a given customer. In some cases, incident management 116 may also track fluctuating loading of networks 130 and 140. In one example, incident management 116 may track a nationally televised telethon generating a surge of telephone traffic, and recognize that this surge is causing incidents for specific regions or customers.

Diagnosis engine 102 may be configured to query incident management 116 with specific information for user 104 to determine if any network incidents are known that could be affecting service for user 104. In some embodiments, incident management 116 may include ticket-based processing for reporting incidents. Diagnosis engine 102 may receive a large number of correlated support tickets and in turn, originate such incidents by reporting to incident management 116.

Further depicted in FIG. 1 is telephone switch inventory 118, which is coupled to diagnosis engine 102 via application interface 152. Telephone switch inventory 118 may maintain information related to the provisioning and installation of electronic switching systems in PSTN 140. Diagnosis engine 102 may thus query telephone switch inventory 118 via application interface 152 regarding the status, configuration, and/or location of a given telephone switch. In some embodiments, diagnosis engine 102 obtains information about one or more telephone switches in response to providing user information to telephone switch inventory 118. Accordingly, if user 104 is a customer having service via PSTN 140, diagnosis engine 102 may query telephone switch inventory 118 for the purpose of diagnosing or remediating a support issue reported by user 104. In some cases, diagnosis engine 102 may access telephone switch inventory 118 for obtaining access parameters for controlling a particular switch in PSTN 140. Telephone switch inventory 118 may also respond to surges in network traffic by provisioning additional network equipment, such as telephone switches on PSTN 140.

Also shown in FIG. 1 is a DBOR 110. DBOR 110 may be accessed by diagnosis engine 102 via application interface 153. DBOR 110 may store information for billing, routing, and/or configuration related to providing telephony service via networks 130 and 140. In some embodiments, DBOR 110 stores the configuration of IP network 130, which may include information related to managed routers, third party network segments, and/or IP switching equipment (not shown in FIG. 1). The information stored in DBOR 110 may be indexed by network address, telephony service account, telephone number or other information. In some cases, DBOR 110 may store account information for user 104, including the current billing status, payment status, and the entitlement of user 104 to access business system 100 for telephony service.

Further shown in FIG. 1 is PSTN interface 122, which diagnosis engine 102 may access via application interface 154. PSTN interface 122 may provide access to all available commands for executing on PSTN 140. In some embodiments, PSTN interface 122 may receive and execute commands for telephone switching equipment in PSTN 140, such as switching a particular telephone line for diagnosing line quality. PSTN interface 122 may further access specialized commands on telephone switching equipment (not shown in FIG. 1) included in PSTN 140, such as configuration commands or diagnostic tests.

Also depicted in FIG. 1 is CTP 120, which may be coupled to diagnosis engine 102 via application interface 155. CTP 120 may execute certain diagnostic commands for testing and reporting the status of equipment in either IP network 130 or PSTN 140. CTP 120 may be configured to execute fewer or different network commands for accessing PSTN 140 than PSTN interface 122, mentioned above. In some embodiments, CTP 120 includes a test executive for performing scripts of selectable test steps and reporting back the results. Diagnosis engine 102 may request network testing via CTP 120 and may query back the results via application interface 155.

As mentioned above, business system 100 in FIG. 1 is configured to provide telephony service via IP network 130 or PSTN 140. IP network 130 may be configured for voice over IP services and may be provisioned as a virtual private network (VPN). In some embodiments, portions of IP network 130 may be provisioned as multiprotocol label switching (MPLS) networks. IP network 130 may further be coupled to third party carriers (not shown in FIG. 1). In some embodiments, IP network 130 provides telephony service to end users via digital subscriber line (DSL) networks (not shown in FIG. 1). As shown in FIG. 1, PSTN 140 may represent either analog or digital telephony switching equipment, or a combination thereof. PSTN 140 may interface with local exchange carrier (LEC) networks (not shown in FIG. 1) for providing access to end users.

As will be apparent from the previous discussion of business system 100 as embodied in FIG. 1, diagnosis engine 102 is configured to utilize application interfaces 150-155 for providing automated customer support. As will be described in detail below, diagnosis engine 102 may further be configured to monitor the operation of application interfaces 150-155, and in some cases, may adaptively adjust parameters related to those interfaces. In this manner, diagnosis engine 102 may contribute to the overall reliability and availability of business system 100.

Application interfaces 150-155 may represent a physical or logical connection between applications, or a combination thereof. The physical connection may be a bus or network interface, and may include a number of intermediate devices or network systems. In some embodiments, a peripheral application, for example, ticket system 114, may be executed on the same physical computing platform as the central diagnosis engine 102, such that the corresponding application interface, for example, 150, embodies a logical interface between applications without a specific physical connection. In some embodiments, one or more application interfaces 150-155 may be wireless interfaces.

The logical connection embodied by application interfaces 150-155 may take the form of a command query and response arrangement, i.e., a transactional communication interface. In such an arrangement, either party may issue commands or queries for desired information, and receive responses with the desired information or confirmation. The transactional command structure may further include error handling, such as the reporting back of acknowledgements or diagnostic codes, which represent a type of status. In one embodiment, diagnosis engine 102 is configured with a common set of diagnostic codes for application interfaces 150-155, which includes specific diagnostic codes that identify a particular application. That is, the diagnostic codes reported back to diagnosis engine 102 upon sending a query via application interfaces 150-155 may include information related to the application interface and to the application itself. It is noted that either diagnosis engine 102, or a peripheral application, may issue a query using application interfaces 150-155.

Application interfaces 150-155 may report back different types of status information, referred to herein as "interface status." In some embodiments, diagnostic codes indicate interface status. One interface status may be a timeout status, which indicates that no response to the query was received within a timeout value. A timeout over an application interface may indicate that the queried application is unable to respond within the timeout value, which could be caused by overloading, or by a hardware or software failure. An interface status of not found may be substantially similar to the timeout status. Another interface status may be a busy status, which indicates that the queried application has received the query, and is able to respond with an interface status, but is unable to execute the command specified by the query. A busy interface status may indicate a high workload on the queried environment, but also that the queried application is able to maintain communication via the application interface. As such, both a timeout and a busy status may be considered non-responsive, because they signal that the queried application is not responding as normally expected or desired.

A further interface status may be a missing data status, which indicates that the queried application has attempted to locate data requested in the query, but that the data were unavailable. A missing data status may indicate that the requested data do not exist, or that some subsidiary system providing the data is not responsive, although the queried application and application interface are operational. A missing data status may be considered a responsive status, because the queried application indicates normal operation.

Diagnosis engine 102 may further be configured with certain query values, or parameters, related to queries performed using application interfaces 150-155. Such query values may include a timeout value, which represents the amount of time an issued query waits for a response before timing out. Another query value may be a monitoring interval, or polling interval, which defines the amount of time between issued queries. A further query value may be a priority value, which defines a priority level for the issued query. A higher priority query is considered to take precedence over a lower priority query, such that the higher priority query is executed first, when possible or feasible.

It is noted that the above mentioned implementations for the transactional command structure of application interfaces 150-155 are exemplary and may be modified in different embodiments of business system 100. A query issued via application interfaces 150-155 that results in a normal or error free response may return no diagnostic code, an error-free code, or an acknowledgement. A query that returns a diagnostic code indicating abnormal behavior, or an error message, is referred to herein as an "alert" or "inter-application alert." During normal operation of diagnosis engine 102, such that all peripheral applications and application interfaces 150-155 are operating substantially without error, a relatively low number of inter-application alerts may be generated. As will be described in detail below, diagnosis engine 102 may be configured to detect and adaptively respond to an increase in inter-application alerts (indicating some type of problem associated with application interfaces 150-155), and take further action to remediate business system 100.

Figure 2:
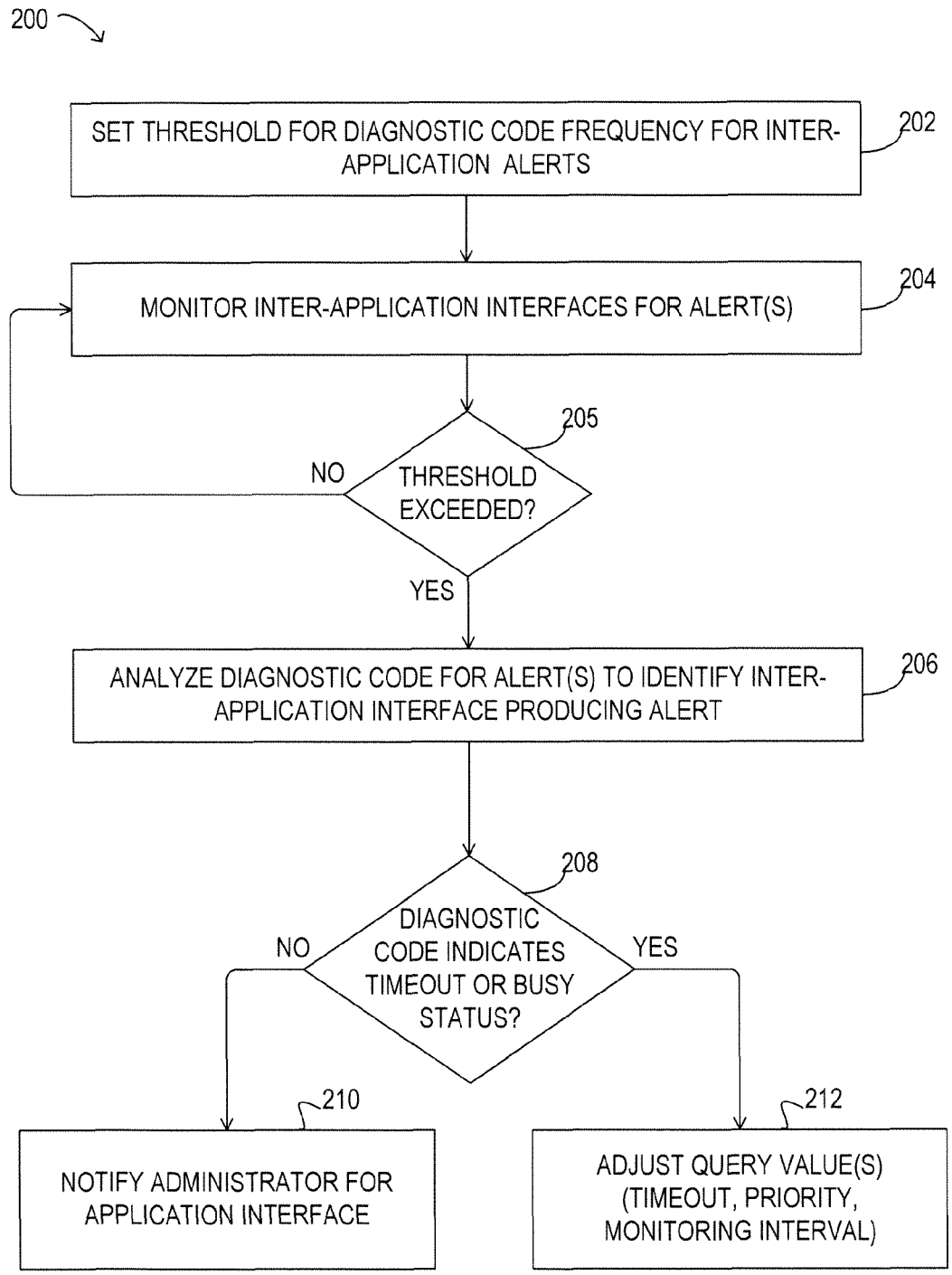
FIG. 2 is a block diagram of selected elements of an embodiment of an interface management process.

Turning now to FIG. 2, a block diagram of selected elements of an embodiment of an interface management process 200 is illustrated. It is noted that diagnosis engine 102 may be configured to execute process 200. A threshold for the frequency, i.e., number per unit time, for inter-application alerts may be set (operation 202). In some embodiments, an adaptive rule may be implemented to set the threshold in operation 202, such that the threshold value is maintained above an expected baseline amount, for example, using a time-window integration technique. Thus, the threshold value may automatically respond to slight drifts. The threshold value may also be set by an operator in operation 202. Inter-application interfaces may then be monitored for alerts (operation 204). In some embodiments, operations 202 and 204 may be repeatedly performed in an alternative, or interleaved, manner.

A decision may then be made if the threshold value has been exceeded (operation 205). If the result of operation 205 is NO, then process 200 may revert to operation 204. In one embodiment, process 200 reverts to operation 202 (not shown in FIG. 2) if the result of operation 205 is NO. If the result of operation 205 is YES, then the threshold has been exceeded, indicating that a relatively large number of inter-application alerts has been generated, along with their respective diagnostic codes. In some embodiments of operation 205, the threshold value is exceeded, but a determination is made that the threshold value has been exceeded by less than a minimum amount, which minimum amount may be relatively adjusted.

The diagnostic codes for the inter-application alerts may then be analyzed to identify the inter-application interface producing the alerts (operation 206). A large number of substantially similar or different types of alerts may be analyzed in operation 206. In some embodiments of operation 206, more than one inter-application interface is identified. The alert may be reduced to one or more diagnostic codes in operation 206, such that the remaining operations in process 200 are performed for each diagnostic code. Additional analysis of diagnostic codes may be performed during operation 206, such as identifying an application or piece of equipment that may have caused an alert.

Next, a decision may be made whether a diagnostic code indicates a timeout or busy interface status (operation 208). If the result of operation 208 is NO, then the corresponding application interface may be considered responsive, and an administrator for the application interface is notified (operation 210). In some cases, the administrator is a maintenance entity for the application interface associated with the inter-application alert. If the result of operation 208 is YES, the corresponding application interface is considered non-responsive, and one or more query values, such as a timeout value, priority value, or monitoring interval, may be adjusted (operation 212). It is noted that query values may be increased or decreased in operation 212. In some embodiments, process 200 is repeated with adjusted query values in an iterative manner.

Figure 3:
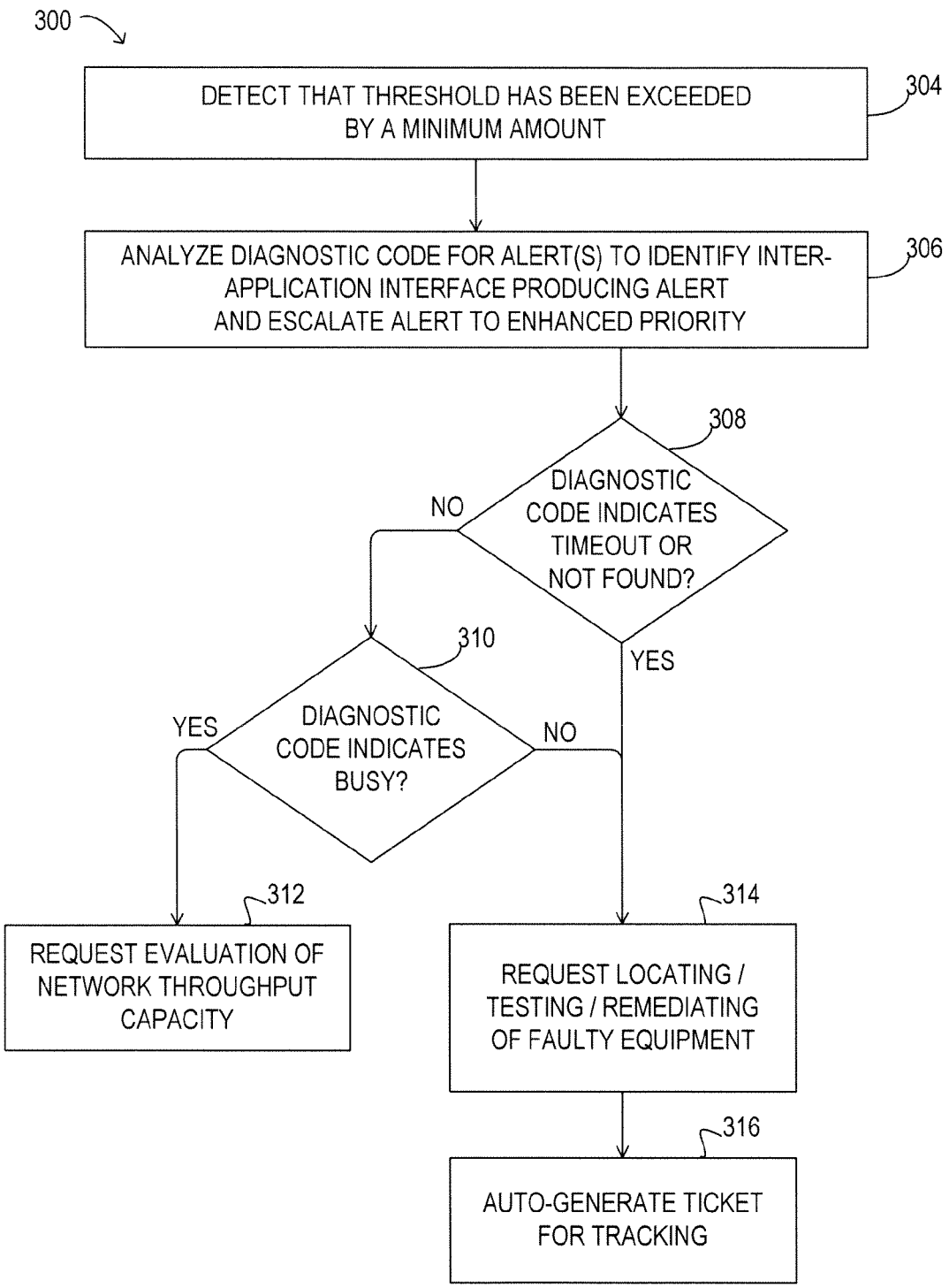
FIG. 3 is a block diagram of selected elements of an embodiment of an interface management process.

Turning now to FIG. 3, a block diagram of selected elements of an embodiment of an interface management process 300 is illustrated. It is noted that diagnosis engine 102 may be configured to execute process 300. In some embodiments, process 300 is performed in conjunction with process 200 shown in FIG. 2.

Inter-application alerts exceeding a threshold by a minimum amount may be detected (operation 304). In some embodiments, operation 304 is performed in conjunction with operations 202 and 204 shown in FIG. 2, as described above. The diagnostic codes for the inter-application alerts detected in operation 304 may then be analyzed to identify the inter-application interface producing the alerts, and the alerts may be escalated to enhanced priority (operation 306). Enhanced priority alerts may be handled prior to other alerts. The analysis performed in operation 306 may be similar to the analysis described above with respect to operation 206.

A decision may then be made whether a diagnostic code indicates a timeout or not found interface status (operation 308). If the result of operation 308 is NO, then a further decision may be made whether the diagnostic code indicates a busy status (operation 310). If the result of operation 308 is YES, or the result of operation 310 is NO, then a request may be issued for locating, testing, or remediating faulty equipment associated with the diagnostic code and corresponding inter-application interface (operation 314). A request to a service organization, or maintenance entity, responsible for identified equipment may be made in operation 314. A ticket may be auto-generated for tracking the request made in operation 314 (operation 316). In some embodiments, a ticket is generated using ticket system 114 in operation 316.

If the result of operation 310 is NO, then an evaluation of network throughput capacity may be requested (operation 312). In some instances, a request for increase in network capacity, such as for IP network 130 or PSTN 140, may be requested in operation 312.

Figure 4:
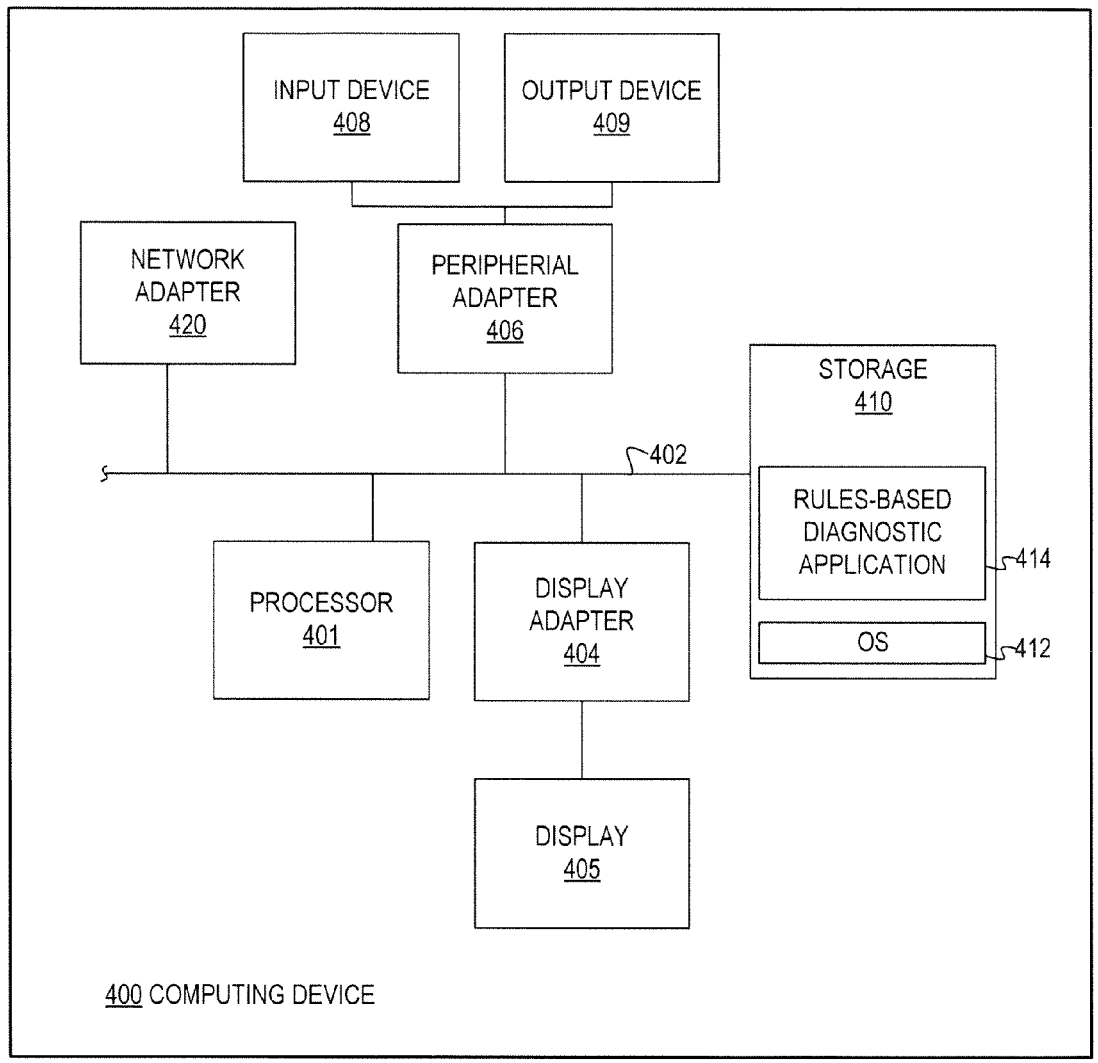
FIG. 4 is a block diagram of selected elements of an embodiment of a computing device.

Referring now to FIG. 4, a block diagram illustrating selected elements of an embodiment of a computing device 400 is presented. In the embodiment depicted in FIG. 4, device 400 includes processor 401 coupled via shared bus 402 to storage media collectively identified as storage 410.

Device 400, as depicted in FIG. 4, further includes network adapter 420 that interfaces device 400 to a network (not shown in FIG. 4). In embodiments suitable for using adaptive application interface management, device 400, as depicted in FIG. 4, may include peripheral adapter 406, which provides connectivity for the use of input device 408 and output device 409. Input device 408 may represent a device for user input, such as a keyboard or a mouse, or even a video camera. Output device 409 may represent a device for providing signals or indications to a user, such as loudspeakers for generating audio signals.

Device 400 is shown in FIG. 4 including display adapter 404 and further includes a display device or, more simply, a display 405. Display adapter 404 may interface shared bus 402, or another bus, with an output port for one or more displays, such as display 405. Display 405 may be implemented as a liquid crystal display screen, a computer monitor, a television or the like. Display 405 may comply with a display standard for the corresponding type of display. Standards for computer monitors include analog standards such as Video Graphics Array (VGA), Extended Graphics Array (XGA), etc., or digital standards such as Digital Visual Interface (DVI), High Definition Multimedia Interface (HDMI), among others. A television display may comply with standards such as National Television System Committee (NTSC), Phase Alternating Line (PAL), or another suitable standard. Display 405 may include an output device 409, such as one or more integrated speakers to play audio content, or may include an input device 408, such as a microphone or video camera.

Storage 410 encompasses persistent and volatile media, fixed and removable media, and magnetic and semiconductor media. Storage 410 is operable to store instructions, data, or both. Storage 410 as shown includes sets or sequences of instructions, namely, an operating system 412, and a rules-based diagnostic application 414. Operating system 412 may be a UNIX or UNIX-like operating system, a Windows® family operating system, or another suitable operating system.

It is noted that in some embodiments, device 400 represents a computing platform for executing diagnosis engine 102, shown in FIG. 1. In some cases, rules-based diagnostic application 414 may represent diagnosis engine 102.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for processing alerts, the method comprising:
   determining, by a processor, a number of inter-application alerts within a monitoring interval exceed a threshold;
   analyzing, by the processor, a diagnostic code associated with a selected one of the inter-application alerts;
   determining, by the processor, an interface status associated with the selected one of the inter-application alerts;
   in response to the diagnostic code indicating a non-responsive interface status, adjusting, by the processor, a query value for the selected one of the inter-application alerts; and
   generating, by the processor, a message indicating the number of the inter-application alerts exceeds the threshold.

2. The method of claim 1, further comprising determining the interface status is a timeout status.

3. The method of claim 1, further comprising determining the interface status is a busy status.

4. The method of claim 1, further comprising:
   determining the diagnostic code indicates a missing data status; and
   generating a notification indicating the selected one of the inter-application alerts.

5. The method of claim 1, further comprising:
   determining the number of inter-application alerts exceeds the threshold by a minimum amount; and
   modifying a priority of at least one of the number of the inter-application alerts.

6. The method of claim 5, further comprising generating a notification indicating modification.

7. The method of claim 6, further comprising requesting to evaluate a throughput capacity of a network system associated with the modification of the priority.

8. The method of claim 6, further requesting evaluation of equipment associated with the network system.

9. A system for processing inter-application alerts, the system comprising:
   a processor; and
   a memory storing instructions that, when executed by the processor, cause the processor to perform operations, the operations comprising:
   monitoring application interfaces between a diagnostic engine and a plurality of applications for inter-application alerts;
   determining one of the inter-application alerts associated with a selected application interface exceeds a threshold;
   determining an interface status based on the one of the inter-application alerts; and
   modifying a timeout value for the selected application interface in response to the interface status indicating a timeout status.

10. The system of claim 9, wherein the operations further comprise modifying a priority value for the selected application interface responsive to the interface status indicating a busy status.

11. The system of claim 9, wherein the operations further comprise generating a notification responsive to the interface status indicating a missing data status.

12. The system of claim 9, wherein the operations further comprise requesting testing of equipment associated with the application interface.

13. The system of claim 9, wherein the operations further comprise processing customer support events in response to providing telephone service to a plurality of customers.

14. The system of claim 9, wherein the operations further comprise interfacing an Internet-protocol network.

15. The system of claim 9, wherein the operations further comprise interfacing a public switched application.

16. The system of claim 9, wherein the operations further comprise interfacing a customer-support ticket system.

17. A non-transitory computer-readable storage including processor executable program instructions that when executed cause a processor to perform operations, the operations comprising:
   in response to an increase in a number of inter-application alerts for an application interface between a diagnostic engine and an application, determining an amount of the increase relative to a threshold value associated with the application interface;
   based on the amount of the increase and a diagnostic code associated with the application interface, determining an interface status for the application interface; and increasing a priority value for the application interface based on the interface status indicating a busy status.

18. The non-transitory computer-readable storage of claim 17, wherein the operations further comprise increasing a timeout value for the application interface.

19. The non-transitory computer-readable storage of claim 17, wherein the operations further comprise notifying an administrator based on the interface status.

20. The non-transitory computer-readable storage of claim 17, wherein the operations further comprise requesting priority service.

* * * * *